United States Patent [19]

Abramson et al.

[11] 3,790,717

[45] Feb. 5, 1974

[54] TELEPHONE COMMUNICATIONS SYSTEM WITH DISTRIBUTED CONTROL

[75] Inventors: Carl N. Abramson, Somerville; Nicholas A. D'Agosto, III, Piscataway, both of N.J.

[73] Assignee: Adaptive Technology, Inc., Piscataway, N.J.

[22] Filed: Aug. 7, 1972

[21] Appl. No.: 278,646

[52] U.S. Cl. .......... 179/15 AL
[51] Int. Cl. .......... H04j 3/00
[58] Field of Search.. 179/15 BA, 15 AL; 340/172.5

[56] References Cited

UNITED STATES PATENTS

| | | | |
|---|---|---|---|
| 3,544,976 | 12/1970 | Collins | 179/15 AL |
| 3,586,782 | 6/1971 | Thomas | 179/15 AL |
| 3,632,881 | 1/1972 | Graham | 179/15 AL |
| 3,643,030 | 2/1972 | Sparrendahl | 179/15 AL |

*Primary Examiner*—Ralph D. Blakeslee
*Attorney, Agent, or Firm*—Kenyon & Kenyon Reilly Carr & Chapin

[57] ABSTRACT

A system for accomplishing distributed PABX functions without tying up lines or channels of communication for each communication. Station identifying address codes are assigned to the subscribers with a plurality of address codes being available to a single subscriber at a given time. The address codes are stored in registers located at the subscriber stations and transferred to receiving stations to effect communication. The processing and handling of the address codes is accomplished locally at the subscriber stations by the user himself by a technique which facilitates the implementation of such conventional PABX functions as call transfer, call storage, call forwarding and call hold. The subscriber terminals are connected in a communications network wherein the subscribers communicate on the transmission media using a predetermined period format. The period format includes assigned portions for handshaking and distribution of address codes as well as portions for communicating textual data. Generally, an originator goes off hook and dials the handshake address code of the party he desires communication with. This address code is placed in a REQUEST FOR SERVICE subperiod of the period (P) on the transmission line. At the receptor terminal, a distributed address code is received for identifying the communications between the two terminals. Each subscriber is provided with registers for storing the address codes to be used by respective communicating subscribers. The possible address codes stored by these registers includes address codes providing handshake identification codes, transferee address codes identifying those subscribers which a given subscriber desires to transfer or forward calls to, the addresses of subscribers calling a given subscriber when such given subscriber is busy with a third party and, essentially, includes the addresses associated with any subscribers which the given subscriber is or will subsequently speak to, or transfer calls to. An address selector and control circuit controls the entry and removal of the address codes into and out of the address registers. The control circuit is connected to both a keyboard for receiving telephone operation command codes, and to an address code detector so as to control the entry and removal of address codes on the transmission media.

In the subject system, the general telephone functions as well as the special telephone features noted above are available on a distributed basis. The subject system provides the characteristic whereby the interface circuitry to the public telephone network very closely approximates the circuitry required at each subscriber station. Therefore, the system does not have the present day limitations on the ratio of the number of stations to the number of trunks. Since the special features are available on a distributed basis, the cost increases linearly as stations are added to the system. In accordance with the subject system, there is no requirement for a central attendant's terminal or a central switching unit, but rather the basic telephone functions are accomplished on an independent basis by the individual subscriber terminals.

35 Claims, 7 Drawing Figures

TELEPHONE COMMUNICATIONS SYSTEM WITH DISTRIBUTED CONTROL

BACKGROUND OF THE INVENTION

1. Field of the Invention

The present invention relates to electronic telephone communications systems and more particularly to a telephone communications system for accomplishing normal connections as well as special telephone services on a distributed basis at the subscriber terminals.

DESCRIPTION OF THE PRIOR ART

In general, conventional telephone systems accomplish normal telephone connections as well as special services, such as call forwarding, call transfer and call hold, by means of a central control processor which, in response to subscriber requests, provides the necessary connections for the subscriber terminals to communicate with each other. Automatic connection of calls is commonly accomplished by a dial pulse receiver and matrix switches which connect a called subscriber line with the calling subscriber's lines. Call transfer arrangements are known wherein a subscriber may dial a code into central switching circuits which, by means of trunk circuits, make a line connection to a transferee subscriber so that the call will be transferred to such transferee subscriber. Also, automatic rerouting systems are known wherein a switching box is connected at the subscriber terminal and activated by the subscriber to interconnect the various telephone lines leading into and out of such switching box.

Time division multiplex telephone systems are known wherein a call connection is accomplished by assigning time slots to the calling and the called terminals. Here, a control device in the central office or switchboard serves to switch the line connections so that the calling and the called stations are assigned to a common time slot for the duration of a call. Once a channel or time slot has been seized for a particular connection, it is retained by that connection until the connection is terminated, and it is not available for any other subscribers. In order to accomplish call transfer in such time division multiplex systems, it is known to assign time slots to the individual parties for a connection while new parties are assigned with random time slots. A central control device, including central storage and switching circuits, provides for the control and connection of speaking paths in accordance with time multiplex principles.

SUMMARY OF THE INVENTION

It is an object of the present invention to provide a telephone system wherein each telephone unit can operate independently without requiring a central control processor.

It is an object of the present invention to provide a telephone system wherein each telephone terminal operates as an independent entity for interfacing directly with other telephone terminals as well as with other digital data devices on the communications line.

It is another object to provide a telephone system which automatically performs special functions, such as call transfer, call storage, call forwarding and call hold, without requiring additional lines or channels for each function.

It is another object to provide a telephone system wherein each telephone terminal operates as an independent entity to effect the special telephone functions.

It is another object to provide a private telephone system wherein each telephone terminal comprises circuitry compatible with the interface trunks connecting to a public telephone network, so as to substantially eliminate any limitations on the ratio of terminals to trunks permitted.

It is another object to provide a telephone system wherein any telephone terminal can function as an attendant for itself as well as for other stations of the system.

It is another object to provide a private telephone system which accommodates both voice and other forms of data information on the same communications line.

It is a further object to provide a telephone system wherein each terminal has the capability of directly interfacing with other line digital devices such as teletype facsimile machines.

These and other objects are achieved by the present invention which provides a plurality of subscriber terminals connected to a transmission line over which such terminals operate independently to communicate with each other by addressing technqiues. The transmission line may comprise a closed loop network or a hierarchy of closed loop networks. The period format on the transmission line includes one of a plurality of subperiods within a period (P) which is assigned for sending an address code for communicating a request for service by a calling terminal to a terminal to be called. Another one of the subperiods is assigned for communicating an address code which identifies the calling terminal. Other portions of the period format are used for communicating voice and other textual data by the subscriber terminals. Each subscriber terminal includes a keyboard for producing the address codes identifying other subscriber terminals and for producing telephone operation command codes. An address code detector at each subscriber terminal is provided for detecting address codes, on the transmission medium, intended for receipt by a given subscriber terminal. A plurality of address storage registers at each subscriber terminal stores address codes, produced at the keyboard or received on the transmission medium. The storage registers store the address code for communicating with a second subscriber terminal and, also store the address code identifying a third subscriber. This third subscriber can be that terminal to which calls are to be transferred or forwarded or those subscriber terminals placed on hold or in call storage by the keyboard. The address code to be used by a subscriber terminal for the ordinary telephone communication is received on the transmission line in an assigned subperiod by the address code detector and entered into one of the address storage registers. Address codes to be used by a subscriber terminal for carrying out special functions such as call transfer, call storage, call forwarding and call hold are entered by such subscriber terminal into the address storage registers by means of a keyboard and a control device at each terminal. The control device serves to control the entry and removal of address codes into and out of said address storage registers in response to the telephone operation command codes received from the keyboard. The control device is also connected to the address code detector so as to control the entry and removal of particular address codes from the transmission line. Thus, the processing and handling of the address codes is accomplished locally at the subscriber terminals by the subscribers themselves.

In operation, when an originator terminal goes off-hook, it dials the handshake address code of the terminal it desires communication with. This dialed address code is then inserted, by the originator subscriber, into the Request For Service subperiod on the transmission line. At the receptor or called terminal, the address code of such called terminal is detected in the Request For Service subperiod on the transmission line. At the receptor or called terminal, the address code of such called terminal is detected in the Request For Service subperiod, thereby informing such receptor terminal of a request for communication by another terminal. The called terminal then detects a distribution address code located in an assigned subperiod and associated with the calling terminal and places this address in one of its address storage registers. Thereafter, the calling and called terminals communicate with each other by means of the distribution address code held in their address storage registers. Ordinary communication between the subscriber terminals can be accomplished by an address coded data technique or by other suitable communications techniques known in the art.

The possible address codes stored by these registers includes the Request For Service Code and the distribution address code providing handshake identification, transferee address codes identifying those subscribers which a given subscriber desires to transfer existing calls to, the addresses for forwarding incoming calls to a transferee subscriber and, generally, the addresses of any subscriber terminals which the given subscriber terminal will subsequently speak to, or will forward or transfer calls to. Regardless of whether there is a transfer or a storage, etc., the subscriber terminals will effect the special telephone operations without requiring line or channel switching connections by a central processor. The single subscriber provides the complete transfer, storage, etc., independently.

In the subject system, the general telephone communication functions as well as the special telephone features noted above are available on a distributed basis rather than being accomplished by a central control processor or mini-computer. The subject system provides the characteristic whereby the interface circuitry to the public telephone network very closely approximates the circuitry located at each subscriber station. Therefore, the system does not have the present day limitations on the ratio of the number of stations to the number of trunks. Since the special features are available on a distributed basis, the cost increases linearly as stations are added to the system. In accordance with the subject system, there is no central attendant's terminal or line switching unit, but rather the basic telephone functions hereinbefore provided by an attendant's terminal is accomplished on an independent basis by the individual subscriber terminals.

It is to be understood that, as used herein, the term "handshaking" is generally defined as the operation wherein intercommunicating stations establish mutual recognition for communicating a readiness or inability to exchange messages. The term handshaking is used herein in accordance with its general definition known in the art of electronic communications, such as is found in the Data Processing Glossary, C20-1699-0, published by International Business Machines, 1969 Edition, where handshaking is defined as the exchange of predetermined signals when a connection is established between two data sets. Furthermore, in the U.S. Pat. No. 3,646,274, issued on Feb. 29, 1972, to Carl N. Abramson and Mark T. Nadir, a "handshaking" operation is disclosed wherein an orginating station alerts a receptor station that a station is attempting to communicate with such receptor station.

DESCRIPTION OF THE PREFERRED EMBODIMENTS

Figure 1:
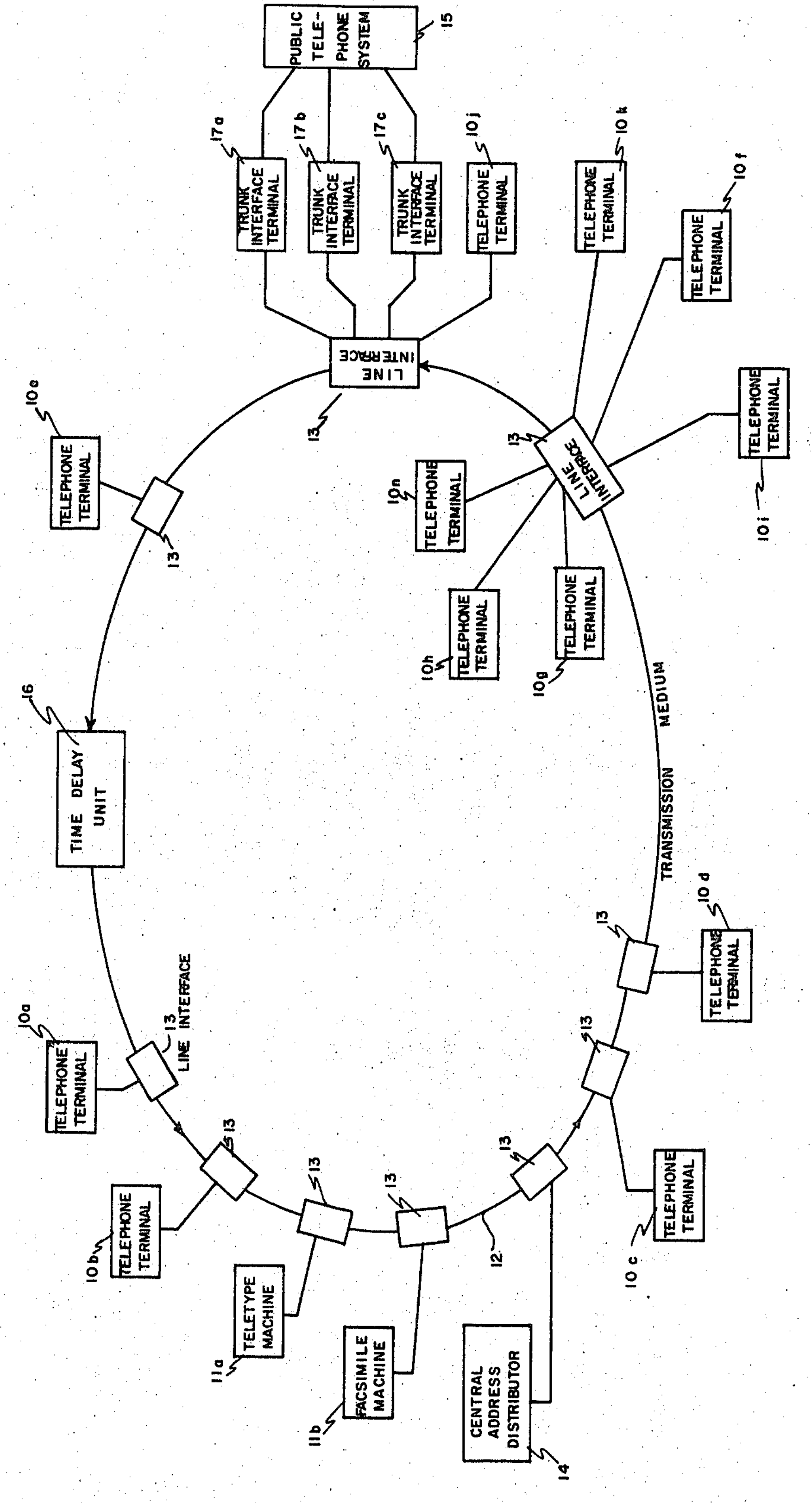
FIG. 1 shows a general system block diagram of the telephone system according to the present invention.

Referring to FIG. 1, there is shown a general system block diagram of the PBX system of the present invention. A plurality of telephone terminals are represented by the numerals 10*a* through 10*n*, which receive data from and send data to the Transmission Medium 12. The telephone terminals 10*a* through 10n, as well as other digital data machines 11*a* through 11*n* are each connected to the transmission medium 12 by means of a line interface 13 which can be common to many terminals. Also, each of the telephone terminals 10*a–n* can communicate with a public telephone system 15 by means of Trunk Interface Terminals 17*a*, *b* and *c* comprising circuitry which is basically identical to that at the telephone terminals 10*a–n*. Also included ara a Central Address Distributor 14, and a Time Delay Unit 16. Time Delay Unit 16 is employed to synchronize the periods (P) and match the timing of the clock pulses and the data sent in the subperiods (SIP) so that the data is circulated on the transmission medium 12 in proper time relationship. This action of the delay unit 16 is commonly referred to as "justification" of the clock pulses and/or periods (P), and/or SIP. This justification function performed by the Time Delay Unit 16 essentially assures that the periods (P) remain as discrete integral units on the transmission medium 12 without overlapping on each other as a result of transmission line delays and the shift register delays accompanying the serial shifting of data through shift registers located at the stations on the transmission medium 12. Time Delay Unit 16 comprises circuitry, such as manually adjustable delay lines for making timing adjustments on a bit-by-bit basis and contains delays of less than one bit in a duration. It is noted that a closed-loop telephone transmission system is shown in FIG. 1 for purposes of explaining the subject invention in a simple and clear manner. Therefore, the present invention is not to be limited to closed-loop telephone systems, respectively.

The Central Address Distributor 14 is disclosed in U.S. application Ser. No. 208,261 filed on Dec. 15, 1971 by Abramson et al. and entitled CENTRAL ADDRESS DISTRIBUTOR. The Central Address Distributor 14 shown in FIG. 1 is preferably employed in an address-coded data communication system wherein communications between a plurality of telephone terminals 10 over the common transmission medium 12 is carried out by sending addresses identifying the sources, destination, or routing of separate units of text data.

One such system which is contemplated for use with the Central SI Distributor 10 is disclosed in U.S. Pat. No. 3,646,274 filed on Sept. 29, 1969 by Carl N. Abramson and Mark T. Nadir and entitled ADAPTIVE SYSTEM FOR INFORMATION EXCHANGE. In this system, the stations operate off of a common reference, or synch, generated by common equipment of the system. The synch enables the stations to identify distinct, repetitive periods (P) as well as the discrete consecutive subperiods (SIP) located within such periods (P). The SIP identification is accomplished by numbering and counting the SIP to determine the position where it appears in its period (P). The SIP are individually assigned with message meanings (words, letters, numbers, symbols or data of any kind) known to the stations. Information is exchanged by inserting, into selected subperiods, signals identifying a sending and/or receiving station so that a receiving station may, in response to the receipt of such signals, derive the message meanings simply by correlating the so-selected subperiods with their assigned message meanings. In this fashion, the signals identify not only the assigned message meaning by its presence in a particular subperiod or SIP, but also identify the sending and/or receiving station. Thus, the message or intelligence is conveyed by employing discrete text subperiods in which an identifying signal (SI) of the sending or receiving station is sent. The receiving station (s) is adapted to detect the SI and, together with counting circuits, determine the exact message meaning conveyed. This meaning may be unique to each pair or group of communication stations. Also, in this system, the station uses its equipment on an "as needed" basis, and the lines and SIP are utilized by others even when the station is on line, but not at that moment sending or receiving information.

Figure 2:
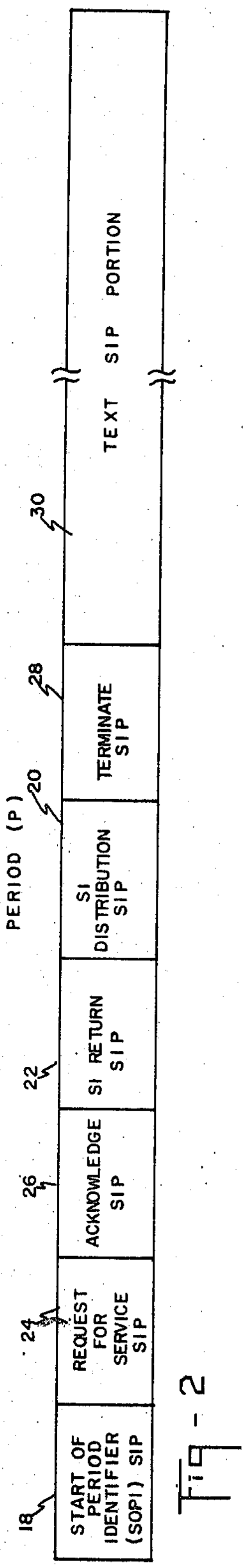
FIG. 2 shows a timing diagram showing the subperiods located in a period (P) illustrating the period format employed by the subject system.

Referring to FIG. 2, there is shown a period structure employed by the present system in carrying out communications between the telephone terminal subscribers 10. Each period (P) includes a Start-Of-Period-Identifier (SOPI) SIP 18 for inserting a timing and synchronization code which providea a reference point for the counting circuits of the system thereby enabling the subscriber terminals to recognize the relative periods in the subperiods located within each of such periods (P). The Start-Of-Period-Identifier (SOPI) SIP 18 is located at another fixed position within the period (P) so that each can detect the individual SIP positions within the period. The central address distributor 14 inserts available SI (identifying addresses) into a SI Distribution SIP 20 from which any terminal desiring to go on line can remove the SI therefrom. The central address distributor 14 has means for detecting if the SIP 20 is empty and, consequently, continuously inserts available distribution SI into the SIP 20 as they are removed by the terminals for use. When a terminal terminates its communication on the line, it returns the distribution SI to the central address distributor 14 by means of a SI Return SIP 22. While the central address distributor 14, described above, inserts available distribution SI into the SIP 20 without receiving any previous requests from stations for such distribution SI, one alternate technique for assigning these distribution SI to the stations is to employ a Request For Service SIP 24 wherein a station makes a bid for a SI by sending a code in the Request For Service SIP 24. This code may, for example, represent the address of the central address distributor 14 and, therefore, is detected by the distributor 14 as a request for an available distribution SI. In response the central address distributor 14 inserts available SI on the line in the SI Distribution SIP 20. The period (P) also includes an Acknowledge SIP portion 26, a Terminate SIP portion 28, and a Text SIP portion 30.

When an originator subscriber goes off-hook, it enters the "handshake" SI or address which identifies the receptor subscriber into the Request For Service SIP 24. As discussed above, this Request For Service SIP 24 is located at a fixed position within each period (P) so that any subscriber desiring to communicate with another subscriber simply enters the handshake identifying SI of such receptor subscriber into this SIP 24 at the appropriate time. In this connection, it is noted that only during this Request For Service portion of the handshake procedure is the permanently assigned handshake SI used for making initial contact with a receptor terminal. These handshake SI are used by the terminals only for the request for service operation to permit the originating terminal to direct a signal to alert a receptor terminal that another terminal is attempting to communicate with such receptor terminals. Once a connection has been established between the originator and receptor terminals, the distribution SI allocated by the central SI distributor is used for communications.

At the receptor terminal, the address or SI of such terminal is detected in the Request For Service SIP 24 thereby informing such receptor terminal that another terminal desires communication therewith. The address located in the Request For Service SIP 24, when detected, automatically indicates to the receptor terminal that it should receive and remove from the line the address located in the SI Distribution SIP 20 in the same period (P). This address is removed from the SI Distribution SIP 20 and stored in the receptor terminal's circuits and used subsequently for communications of address-coded data between the originator and the receptor terminals. This "Distribution SI" is used for other handshaking and control functions, such as for sending an acknowledge statement back to the originator terminal via the acknowledge SIP 26, as well as for sending address coded text data in the Text SIP Portion 30 of the period (P).

Figure 3:
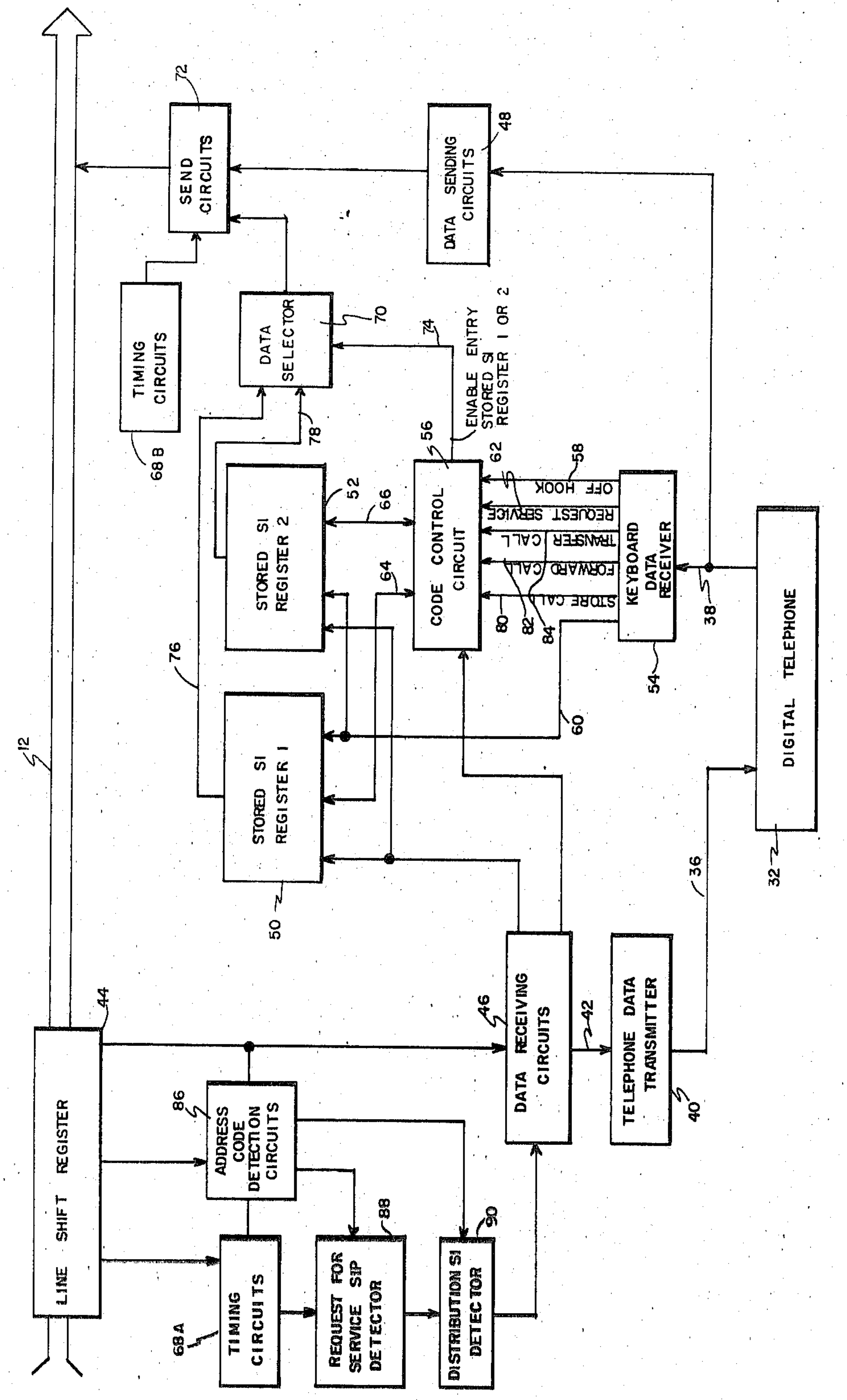
FIG. 3 shows a generalized circuit block diagram of a single telephone subscriber terminal.

Referring to FIG. 3, there is shown a generalized circuit block diagram of the telephone subscriber terminal 10. A Digital Telephone 32 is connected to other portions of the terminal 10 by means of a receive wire 36 and a transmit wire 38. The Digital Telephone 32 contains circuits for conversion of an analog voice signal into a digital format for transmission over a digital communications network. Conversely, the digital telephone circuits convert the data received on the digital communications network into an audible analog signal. In addition, means are provided for transmitting keyboard and status information into the terminal 10. A Telephone Data Transmitter transmits data and handshake command information received on line 42 from the Transmission Medium 12 via a Line Shift Register 44 and Data Receiving Circuits 46 for transmission to the Digital Telephone 32. Telephone data is sent on to the Transmission Medium via Data Sending Circuits 48 which produces and holds coded voice data as well as other types of data in a form suitable for communicating on the Transmission Medium 12. Two Stored SI Registers 50 and 52 are used to store the addresses of other stations with which the given station is or potentially will be communicating with. Registers 50 and 52 are also used to store the addresses of stations attempting incoming calls to enable call storage, as well as storing addresses for accomplishing call forwarding and call transfer as well as other special telephone functions to be described hereinafter.

A Keyboard Data Receiver 54 provides the appropriate connections to a Code Control Circuit 56 for carrying out the basic as well as the special telephone functions described. For example, an OFF-HOOK data signal is provided on line 58 at the output of the Keyboard Data Receiver 54 when an originator subscriber goes off-hook at the Digital Telephone 32. Also, when a Request Service code is dialed at the digital telephone 32, one of the Stored SI Registers 50 or 52 is primed to receive the dialed Request Service code via line 60 from such Keyboard Data Receiver 54. The Request Service command is transmitted by the Keyboard Data Receiver 54 on line 62 to the Code Control Circuit 56 which, in turn, through lines 64 and 66, prepares the available Stored SI Register 50 or 52 for receipt of the address code on line 60. The Request Service code received in the Stored SI Register 50 or 52 represents the address code for communicating with a receptor subscriber. At the appropriate time as provided by Timing Circuits 68*a* and 68*b*, the Request Service address code held by the Stored SI Register 50 or 52 is passed through a Data Selector 70 and Send Circuits 62 and entered on the Transmission Medium 12 in the Request For Service SIP 24 of the period (P). Since only one of the addresses held in the Stored SI Registers 50 and 52 can be entered in the transmission medium at a given time, the Code Control Circuit 56 provides the necessary logic control for enabling, via line 74 the Data Selector 70 to select which address on line 76 and 78, respectively, from the Stored SI Registers 50 and 52 is to be sent at a given time. The Keyboard Data Receiver 54 also provides command signals to the Code Control Circuit 56 in the form of a Store Incoming Call signal on line 80, Forward Incoming Call signal on line 82 and Transfer Incoming Call signal on line 84.

The receiving portion of telephone terminal 10 includes, in addition to the Data Receiving Circuits 46 and the Telephone Data Transmitter 40, Address Code Detection Circuits 86, a Request For Service SIP Detector 88 and a Distribution SI Detector 90. The Request For Service SIP Detector 88, in conjunction with Timing Circuits 68*a* informs the telephone terminal when the condition arises wherein another telephone is attempting communication as evidenced by the detection of such terminal's permanently assigned address code in the Request For Service SIP 24. The Address Code Detection Circuits 86 indicates to the Request For Service SIP Detector 88 when such assigned SI appears in the Line Shift Register 44. At this time, circuits 86 and 88 are effective to enable the telephone terminal to accept and store the distribution SI appearing in the SI Distribution SIP 20 of the same period (P) in which the Request For Service was received. To accomplish this, the Distribution SI Detector 90 causes the Data Receiving Circuits 46 to insert the received distribution SI into an available one of Stored SI Registers 50 and 52. From this point on, the telephone terminal 10 can store, forward or transfer the received call, or alternately, such terminal can communicate with the originating terminal by means of the address held in the Stored SI Register 50 or 52.

Thus, the telephone terminal 10 described above according to the present invention enables any terminal of the system to independently communicate with any other terminal without requiring a central control processor for effecting switching connections between the communicating stations. Also, the subject telephone terminal 10 permits the special telephone features to be carried out on a distributed basis wherein each terminal operates independently of a central control processor. In addition, the subject telephone terminal 10 provides for the simultaneous telephone data communications and special telephone features along the same pair of transmission lines, thereby without requiring separate sets of lines for each communication of a given terminal with two or more other subscriber terminals.

It is to be noted that the terminals in the subject system need not necessarily communicate by means of a Distribution SI from the Central SI Distributor, but instead there can be addresses or SI which are permanently assigned to the individual terminals and used for the communication of both handshaking and text information. In such case, the system hardware would be slightly changed to accommodate this modified system operation. Here, the permanently assigned address of an originator terminal could be communicated in the SI Distribution SIP 20 during handshaking in a manner which informs the receptor terminal of the address to be assigned for that communication.

Figure 4:
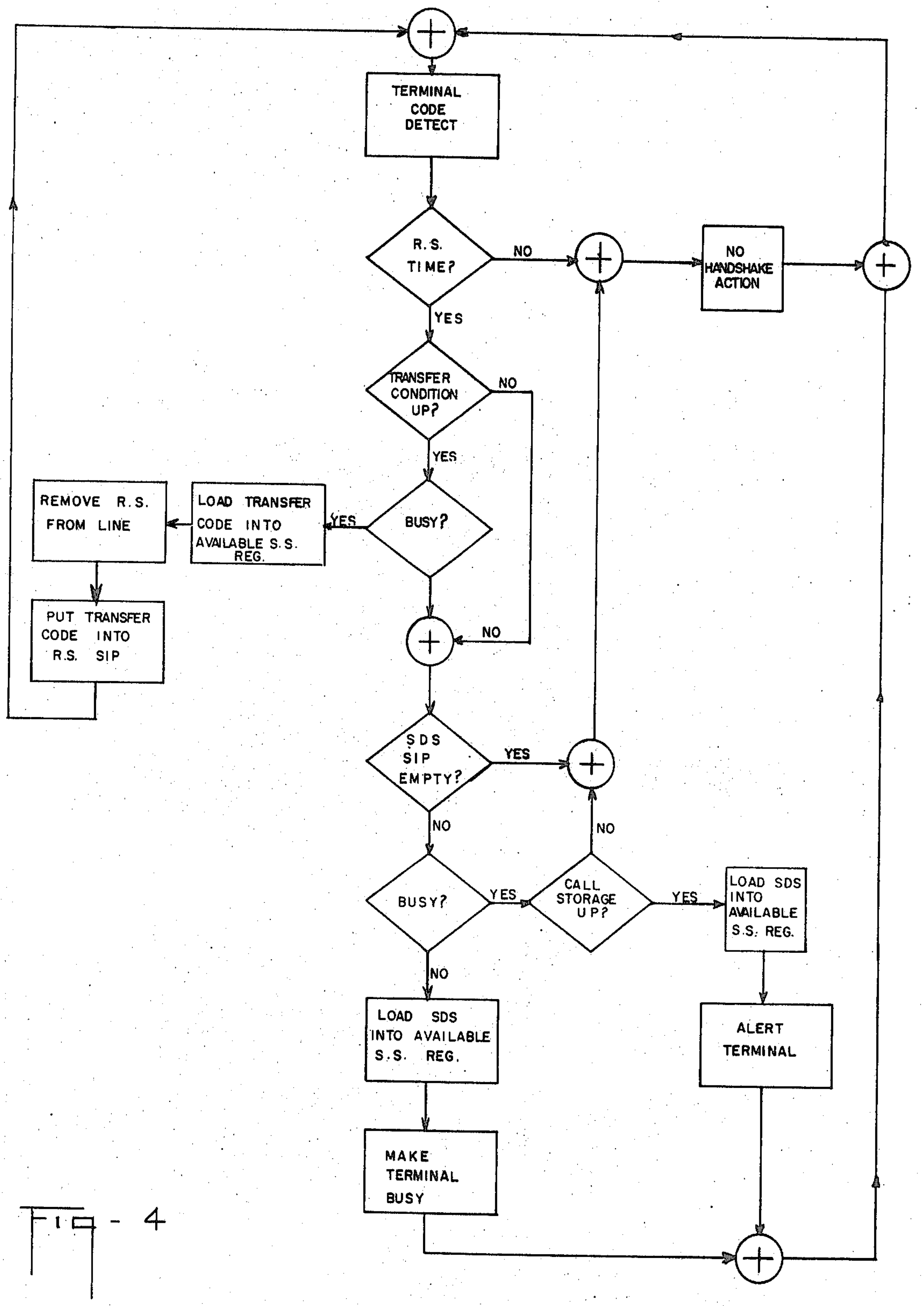
FIG. 4 is a code control flow chart illustrating the operation in which a receptor terminal receives a request for service from an originating terminal.

Referring to FIG. 4, there is shown a code control flow chart illustrating the operation in which a receptor terminal receives a request for service from an originating terminal. Referring to the top of chart, when a terminal sees its code in a SIP, the first inquiry made is whether the code detect occurred during request service time. If it did not, no handshaking action is taken. If it occurred during request service time, the next question is whether the transfer condition had been set. If it has been set, the following question is whether the terminal is in the busy condition. If the terminal were not busy and the SI distribution SIO was empty, no handshaking action would be taken. If the transfer condition had not been set and the SDS SIP was empty, again, no handshaking action would be taken. Under the condition where the transfer is up and the terminal is not busy and the SDS SIP is not empty, a valid request service has been received. The code in the SDS SIP must be stored in the available stored SI Register. In addition, the condition of the terminal must be made busy. Under the condition where the transfer condition had been set and the terminal was in the busy condition, the code, namely the terminal code in question occurring in the request service SIP, must be replaced with the code of the station to which the call is to be transferred. The code of that station would have been previously stored in one of the stored SI registers so that, when the request for service is detected, the code in that time slot is replaced with the code of the transferree station.

Call storage is affected when a terminal is in the busy condition and the terminal had previously indicated that incoming calls should be stored. The other condition for call storage to be affected is that we receive a request service SIP with a code in it and the SI distribution SIP contained a non-empty code. Under these conditions, the code in the SDS SIP must be stored in the available stored SI register and the called terminal alerted that an incoming call has been received. This may be accomplished either by visual and/or audible signal. By operation of the hold key at the digital telephone, the incoming call may be answered. Repeated operation of the hold key will switch the called terminal between the original call that was in progress and the incoming call just received.

Figure 5:
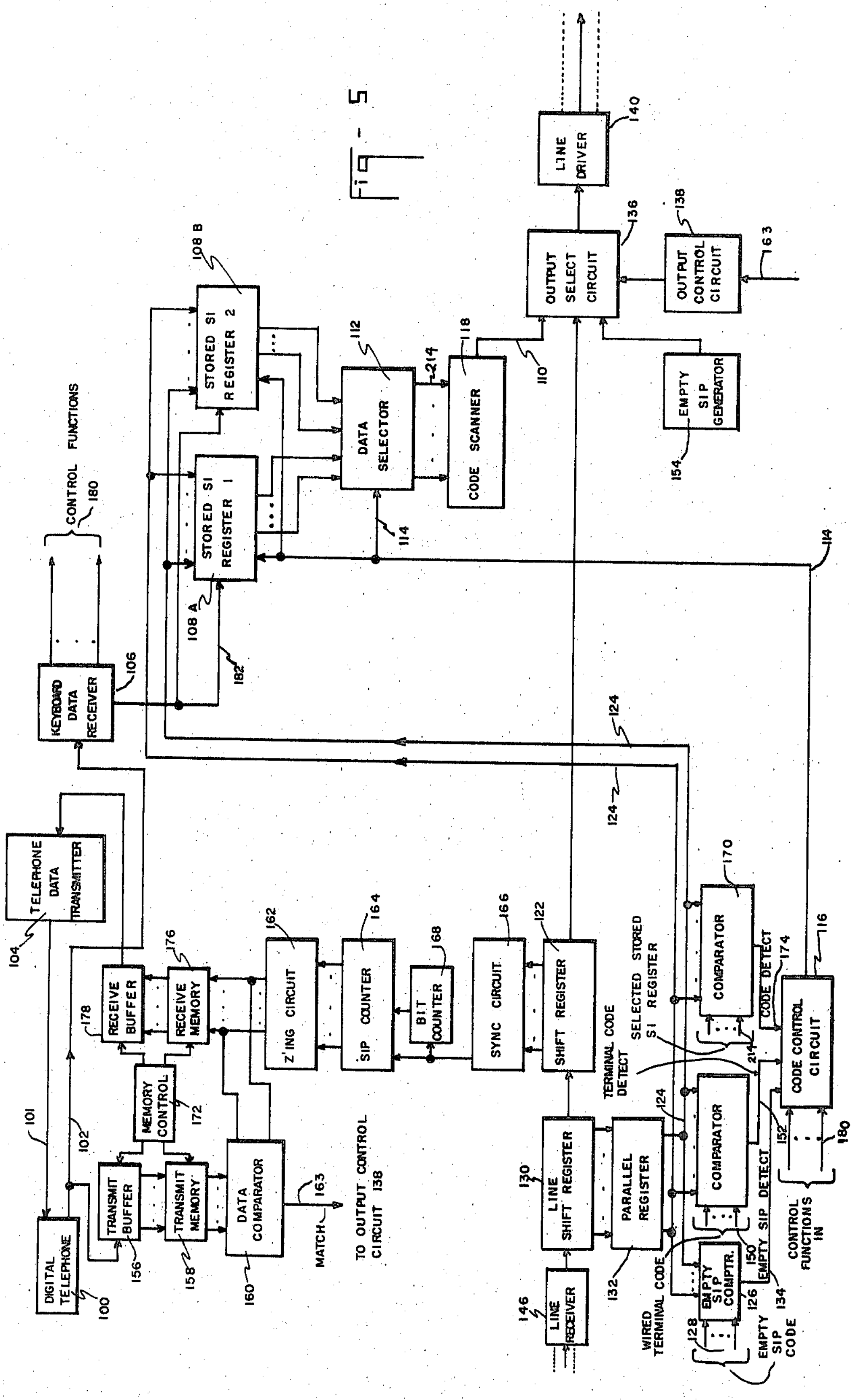
FIG. 5 shows a detailed circuit block diagram of a subscriber telephone terminal such as that generally described with reference to FIG. 3.

Referring to FIG. 5, there is shown a circuit block diagram of the subscriber telephone terminal 10 employed by the present invention. A Digital Telephone 100 is provided which is similar to the digital telephone described with reference to FIG. 3. A Telephone Data Transmitter 104 transmits data and handshake command information received on the transmission line to the Digital Telephone 100 over line 101. The Digital Telephone 100 transmits telephone data via a transmit line 102 for sending onto the communications line and also transmits telephone operation command codes on the same line 102 to a Keyboard Data Receiver 106. When an originator subscribed goes off-hook at the Telephone 100, an off-hook data signal is sent by the Telephone 100 on line 102 to the Keyboard Data Receiver 106 which in turn decodes the input data stream and recognizes the off-hook signal. A Stored SI Register 108A or 108B is primed to receive a dialed Request Service code in serial fashion from the Keyboard Data Receiver 106. This Request Service Code, which is dialed at the Digital Telephone 100 and loaded into the Stored SI Register 108A or 108B, represents the wired terminal code of the receptor. A Data Selector 112 receives control signals on line 114 from a Code Control Circuit 116 which direct such Data Selector 112 as to which of the codes presented to such Data Selector 112 are to be directed to a Code Scanner 118. Code Scanner 118 is a parallel to serial converter which converts the parallel bit codes received from Data Selector 112 into a serial bit stream provided on its output line 110. Data Selector 112 is connected to receive stored codes from the Stored SI Registers 108A and 108B. The Code Control Circuit 116 directs the Data Selector 112 to present the contents of either Register 108A or Register 108B to the Code Scanner 118 which operates in bit synchronism with the output of a Shift Register 122. In the above discussed example, the particular Stored SI Register 108A or 108B which selected is determined by the Code Control Circuit 116. Details of the Code Control Circuit are provided in a subsequent portion of this specification relating to the FIGS. 6 and 7.

One technique for setting up communications between subscribers is as follows. An originator subscriber upon going off-hook and dialing the code of the subscriber he desires to communicate with causes the dialed code automatically to be placed in an available Request For Service SIP on the line. The originator subscriber then receives and stores from the line an address (SI) code located in the SI distribution SIP in the same period (P) as the Request For Service SIP used by such subscriber. If the SI Distribution SIP was empty and therefore contained no available address code, the originating subscriber repeats the process in the following period (P) and subsequent periods until an empty Request For Service SIP and an available SI Distribution SIP code are detected in the same period (P). Essentially, the originator subscriber is accomplishing two functions, the first function being that of requesting service of a receptor subscriber, and the second function being to communicate to such receptor an address code for the two subscribers to communicate with. At the receptor terminal, the Request For Service SIP is received and recognized only when an address code is located in the SI Distribution SIP in the same period (P). When both of these conditions are met, the receptor terminal stores the SI Distribution SIP address code and removes it from the line so that it is unavailable for use by other terminals. Thus, the two terminals store the same address code and communication may now occur.

An Empty SIP Comparator 126 compares an empty SIP code presented on lines 128 with the transmission line SIP contents provided on the output lines 124 of a Parallel Register 132. Parallel Register 132 holds the contents of a Line Shift Register 130 on a SIP-by-SIP basis as such contents is shifted through the Register 130. During a Request For Service SIP if an empty SIP is detected by the Comparator 126 monitoring in parallel the SIP coded in Parallel Register 132, then an EMPTY SIP DETECT signal will be produced on line 134 to the Code Control Circuit 116 which in turn provides an enabling signal on line 114 to cause the Code Scanner 118 to enter its data, i.e., the desired code, into the Request For Service SIP via an Output Select Circuit 136, an Output Control Circuit 138 and a Line Driver 140. At this time, the SI Distribution SIP will be monitored for a non-empty (available) SIP by means of the empty SIP Comparator 126.

When an available, or non-empty, SI Distribution SIP is detected, the Code Control Circuit 116 loads the distribution SI code appearing at the output of the parallel Register 132 into one of the Stored SI Registers 108A or 108B. The Code Control Circuit 116 also permits the Output Control Circuit 138 to enable the SI Distribution SIP to proceed through the subscriber terminal unaltered for storing and clearing by the receptor terminal located down the transmission line.

At the receptor terminal, the line data is received by a Line Receiver 146, fed into the Line Shift Register 130 and entered as a complete SIP in the Parallel Register 132. It is noted that the terminal structure shown in FIG. 5 is identical for the originator and receptor terminals, since each terminal can assume either status as an originator or a receptor. A handshaking code identifying the receptor terminal for handshaking purposes is detected by a Comparator 148 which compares the line data with its wired terminal code connected on lines 150. When the wired terminal code is detected by the Comparator 148 during the Request For Service time, a TERMINAL CODE DETECT signal will be produced on output line 152 which is applied to the Code Control Circuit 116 for priming the logic circuits located therein for receiving the distribution SI code in the SI Distribution SIP. The Empty SIP Comparator 126 detects if the arriving SI Distribution SIP is empty. If such SIP is empty, according to one handshaking technique employed, the priming condition set forth above is released in a manner whereby the Request For Service which contains the receptor terminal's wired handshaking code is ignored. On the other hand, when a non-empty SI Distribution SIP is found in the same period (P) in which the Request For Service is received, the distribution SI code is received and loaded from the Parallel Register 132 into either the Stored SI Register 108A or 108B. Upon removal of the received distribution SI code from the line, the Output Select Circuit 136 enters an empty SIP provided by Empty SIP Generator 154 on the line in place of the received distribution SI code.

When both the originator and receptor terminals have stored the distribution SI in their respective storage circuits during the handshaking procedure, transmission of voice information in the text SIP portion 30 of the period (P) may now take place using appropriate conventional voice communication systems or, if desired, the voice communication system disclosed in U.S. Pat. No. 3,718,768, issued on Feb. 27, 1973 to Carl N. Abramson et al., and entitled VOICE OR ANALOG COMMUNICATION SYSTEM EMPLOYING ADAPTIVE ENCODING TECHNIQUES, may be employed with the subject system. In such patent application, there is disclosed a system for transferring voice and other analog information from one to another of a plurality of stations in a multistation communications network. At the sending stations, an encoder samples the voice or other analog signals for sets of values of one or more characteristics, and assigned number codes corresponding to such sampled sets of values are stored in sequence in a buffer. Each of the number codes is in turn assigned to respective ones of a multiplicity of discrete subperiods within the text portion of each of a series of periods (P). Signals identifying receiving stations are inserted at indiscriminate rates on the transmission medium into the available subperiods corresponding to the stored codes in a manner which removes the stored codes in sequence from the buffer. In this fashion, a sampled characteristic of an input analog signal is transmitted by storing the number code corresponding to such sampled characteristic, and then inserting an identification signal into the subperiod assigned to the stored number code. A known number of subperiods constitute each of the repeating periods (P). Each receiving station detects its own identification signal on the transmission medium and correlates the subperiods in which the identification signals are detected with their respective number codes. A decoder converts such number codes to their respective assigned sets of sample values from which it reconstructs the original voice or other analog signal.

Referring again to FIG. 5, the voice signal is converted to a digital format at the Digital Telephone 100 which is loaded serially into the Transmit Buffer 156. The data bits are shifted in parallel into a Transmit Memory 158 which, under the control of a Memory Control 172 presents its output to a Data Comparator 160. Data Comparator 160 compares the output from Transmit Memory 158 with the output from a Z-circuit 162 and provides a signal on output line 163 when a match is detected. The purpose and operation of the Z-circuit 162 is disclosed in the above-noted patent application Ser. No. 169,993.

When a match is detected by the Data Comparator 160 and indicated on line 162 leading into the Output Control Circuit 137, and the Empty SIP Comparator 126 detects an empty SIP in the Line Shift Register 130, then the Output Select Circuit 136 of a sending terminal will enter the address provided by the Code Scanner 118 on the transmission line. The address is entered into the SIP produced by the SIP Counter 164 when the match was made by the Data Comparator 160. A Sync Circuit 166 includes a circuit for detecting the presence of a sync code on the transmission line when it appears on the Shift Register 122. The Sync Circuit 166 is connected to a Bit Counter 168 and the SIP Counter 164 in a manner which increments the SIP Counter 164 to correspond with the SIP count of data entered into the Shift Register 122.

The detection of incoming data, such as voice information, is accomplished by a Comparator 170 which compares the output from the Parallel Register 132 with the output of the Data Selector 112 on lines 214 into the Comparator 170. When detection is made of an incoming stored distribution SI (address) by means of the Comparator 170, a CODE DETECT SIGNAL is provided on output line 174 to permit the detected SIP count in SIP Counter 164 to be entered, after DE-Zing such SIP count in Z-circuit 162, to a Receive Memory 176 for subsequent entry into a Receiver Buffer 178. The contents of the Receiver Buffer 178 are shifted in serial fashion to the Digital Telephone 100 where a receiving demodulator, not shown, converts it to an audio signal.

Some of the special code processing functions which are implemented with the terminal structure shown in FIG. 5 include call transfer, call storage, call forwarding, and consultation hold. The use of the Stored SI Register 108A and the Stored SI Register 108B permit code handling operations by either a receptor or originator terminal.

It is noted that the following descriptions of the special code processing functions are made with the assumption that a normal link has already been established by the handshaking technique previously described.

CALL STORAGE

Call Storage is accomplished by detecting, at an intended receptor terminal, the wired terminal code on lines 150 of such receptor terminal using the Comparator 148 which detects the terminal code received on the transmission line in the Line Shift Register 130. This terminal code is detected during the Request For Service SIP time and indicates that another terminal subscriber is attempting to communicate with the terminal identified by the terminal code. The receptor terminal receives a distribution SI code in the SI distribution upon detection of its terminal code in the Request For Service SIP, in the manner described above. This distribution SI code is loaded into the available Stored SI Register 108A or 108B.

Upon detecting and storing of the incoming call, a visual and/or audible signal is given to the busy called party so that he can place the first party, that is, the original party which he was communicating with, on hold while answering the incoming call. The holding operation is accomplished by activation of a special signalling key, not shown, at the Digital Telephone 100 which transmits a HOLD code to the Keyboard Receiver 106. Receiver 106 recognizes the HOLD command as it decodes the received bit pattern and provides control function signals on lines 180 leading into the Code Control Circuit 116. In turn, upon receipt of the HOLD command signals, the Code Control Circuit 116 enables the newly activated Stored SI Register 108A or 108B, storing the incoming call, to be used by the Data Selector 112 for presentation by Code Scanner 118 to the Output Select Circuit 136. The selected SI in Stored SI Registers 108A and 108B are selected by the Data Selector 112 for presentation on lines 214 to the Comparator 170. The particular SI code presented on lines 214 to the Comparator 170 affects reception by the subscriber terminal since the Comparator 170 will then be set to detect only that selected SI code as it appears in the Line Shift Register 130. Re-operation of the HOLD key causes the distribution SI associated with the original party held in the other stored SI register to be selected for conversation.

In this fashion, call storage is accomplished by storing the SI code associated with an incoming call and, through address selection means, conversations are carried out with the original caller or with the later received imcoming call.

CONSULTATION HOLD

The function of consultation holding is somewhat more general than the function of call storage. Specifically, consultation holding may be employed by a busy party who desires to dial a third party for a brief time and then re-establish the original connection without being required to re-dial. Operation of the special HOLD key generates a consultation hold in the same manner as previously described for the HOLD command, which is received and recognized by the Code Control Circuit 116. Knowing that another incoming call did not arrive, the Code Control Circuit 116 will enable the entry of dialed digits into the available Stored SI Register 108A or 108B. The sequences of operation for establishing a normal call will then follow with the first call being HELD in the Stored SI Register 108A or 108B originally employed for that first call. After completion of the second call, the subscriber terminal then re-operates the HOLD key which causes the Code Control Circuit 116 to select the original stored SI register distribution SI code for transmission.

In summary, for either the call storage or consultation holding operation, where two parties, such as A and B are busy talking with each other and a third party, such as C dials the number of party A; or parties A and B are talking with each other and party A wishes to dial the code of party C while maintaining a hold with the party B; then, generally, the distribution SI used between parties A and B will be stored in a first SI register while the distribution SI to be used between parties A and C is received and stored in the second stored SI register. A stored SI register selector operates as an address selector to permit the HOLD operation with the first stored SI register while active communications are carried out between the subscriber terminals operating with the SI stored in the second stored SI register. Thus, these stored SI registers enable call storage, consultation holding and other call transfer operations, to be later described, by selectively switching or changing the address sent and received by the subscriber terminal. It should be noted that through the addition of Stored SI Registers, additional calls may be stored or held, at the cost of one register per call.

CALL FORWARDING

Call forwarding occurs when a called terminal is busy and the call is forwarded to a number previously selected by the busy subscriber terminal. An address code identifying a terminal to which a call is to be forwarded is stored by the subscriber terminal. When such terminal is busy and a Request For Service and SI Distribution codes are received by the busy terminal, the SI code located in the Request For Service SIP 24 is changed to the SI code identifying the forwarded station. The SI distribution code sent by the calling station is allowed to pass through the busy terminal unchanged. The SI code of the forwarded station is predialed into the auxiliary stored SI register of the busy party.

A second call forwarding operation is provided whereby all calls are forwarded to a preselected terminal, regardless of whether the called subscriber is busy. Operation of a TRANSFER TO signal key in the Digital Telephone 100 causes an operation code to be produced on output lines 180 of the Keyboard Data Receiver 106 leading into Code Control Circuit 116, thereby enabling entry of the dialed SI code into the Stored SI Registers 108A or 108B as would normally occur. This code is stored until it is changed or removed from storage by the subscriber. The stored code includes a suffix for indicating the transfer of all calls or the transfers of calls only when busy. In either case, when a Request For Service SIP is received by a transfer terminal and the transfer or forwarding mechanism is engaged, the Code Control Circuit 116 causes the contents of the previously selected Stored SI Register 108A or 108B to be converted into serial form by Code Scanner 118 for entry onto the transmission line in the Request For Service SIP, thereby effecting the call forwarding. Also, the SI code in the SI Distribution SIP is allowed to proceed through the transferring terminal unaltered to the transferee terminal. If the transfering terminal is busy, transmission is momentarily interrupted while this forwarding operation is completed until the distribution SI code previously used is reselected by the Data Selector 112 and presented to the Code Scanner 118.

An example of call forwarding is as follows. Where the parties A and B are talking with each other and the third party C desires to talk with party B, a Request For Service is sent by party C to party B together with the Distribution SI code stored by the Party C. Party B is busy but wants the call transferred to his secretary F and therefore removes the Request For Service B off the line and substitutes the Request For Service F on the line while leaving the Distribution SI on the line unchanged. When this is done, party C is now talking to the party F since the Request For Service was changed to the transfer point F with the distribution SI of C also being transferred to the party F.

CALL TRANSFER

Call transfer is accomplished by operation of a transfer key which permits entry, into the available Stored SI Register 108A or 108B, of a dialed address code identifying the party to whom the call is to be transferred. The dialed transfer code is selected by Data Selector 112 and presented to the Output Select Circuit 136 via Code Scanner 110 for subsequent entry into the Request For Service SIP. Since the remote terminal being transferred already has a distribution SI code, it is this code that must be communicated to the party to whom the call is being transferred. The transferring party has the distribution SI code in one of its Stored SI Registers 108A or 108B. The incoming Request For Service SIP 24 is monitored for the empty condition by the transferring party and the Code Control Circuit 116 causes the Data Selector 112 to select the dialed address code from the appropriate Stored SI Registers 108A or 108B for entry in the Request For Service SIP 24. Selector 112 selects the other Registers 108A or 108B for entry of the original distribution SI code on the line in the SI Distribution SIP 20.

In summarizing the call transfer operation, where party A is talking to party B and the party B wishes to transfer the call to the party C, the party B dials and enters the address code of the party C into the Request For Service SIP 24, and also enters the assigned distribution SI code into the SI Distribution SIP 20 of the same period (P).

Figure 6:
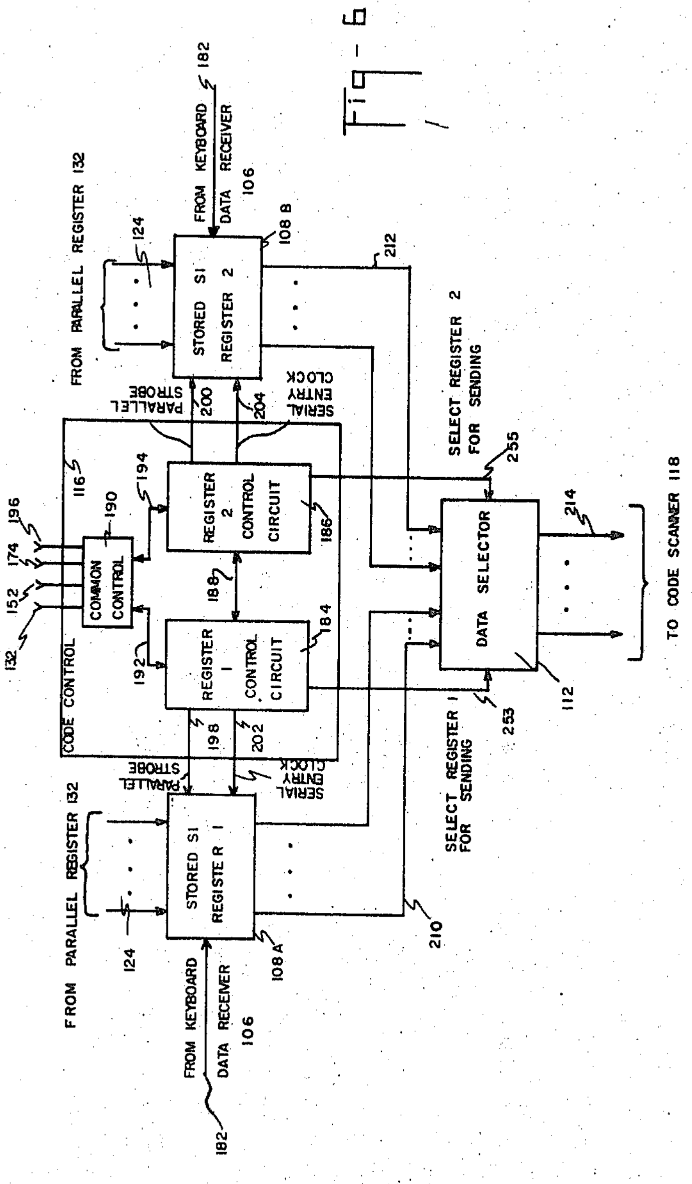
FIG. 6 shows a generalized circuit diagram illustrating the functional operation of the code control circuit.

Referring to FIG. 6 there is shown a block diagram representation of the functional operation of Code Control Circuit 116 and the interconnections leading into and out of such circuit. The Stored SI Registers 108A and 108B are capable of receiving either serial entry on line 182 from the Keyboard Data Receiver 106, or receiving parallel entry on line 124 from the Parallel Register 132. The Code Control Circuit 116 comprises essentially two Register Control Circuits 184 and 186 communicating with each other via lines 188, and communicating with a Common Control 190 via lines 192 and 194, respectively. Register Control Circuits 184 and 186 basically function to load the Stored SI Registers 108A and 108B, respectively, with data from either the Parallel Register 132 or from the Keyboard Data Receiver 107 and to Select the proper one of such registers 108A and 108B at the appropriate time for transmission of the stored code on the transmission line. Loading of data into the Stored SI Registers 108A and 108B is carried out in either of two ways. One manner of loading involves loading the data in serial fashion from the Keyboard Data Receiver 106 when a code is dialed at the Digital Telephone 100. A second manner of loading data into the Stored SI Registers 108A and 108B is to receive such data on lines 124 from the Parallel Register 132 when it is received on the transmission medium in the SI Distribution SIP 20 following a Request For Service. Selection of the address held in Stored SI Register 108A or the Stored SI Register 108B for transmission is a function of which of such registers contains the address of the terminal for the control operations desired, i.e., call transfer, call storage, consultation hold and call forwarding, the details of which will be provided hereinafter.

Referring again to FIG. 6, the Common Control 190 is connected to the EMPTY SIP DETECT line 134, the TERMINAL CODE DETECT line 152 and the CODE DETECT line 174. Upon receipt of detection signals on these lines 134, 152 and 174, the Common Control 190 provides, via the Register Control Circuits 184 and 186, PARALLEL STROBE signals on lines 190 and 200, and SERIAL ENTRY CLOCK signals on lines 202 and 204 leading into the Stored SI Registers 108A and 108B, respectively, Also, the Register Control Circuits 184 and 186 provide select signals on lines 253 and 255, respectively, leading into the Data Selector 112 for enabling the receipt of stored address codes on either of lines 210 or 212 from the appropriate one of Stored SI Registers 108A and 108B. Upon receipt of the selected stored address code the Data Selector 112 supplies this data on lines 214 to the Code Scanner 118 for sending on the transmission line.

Figure 7:
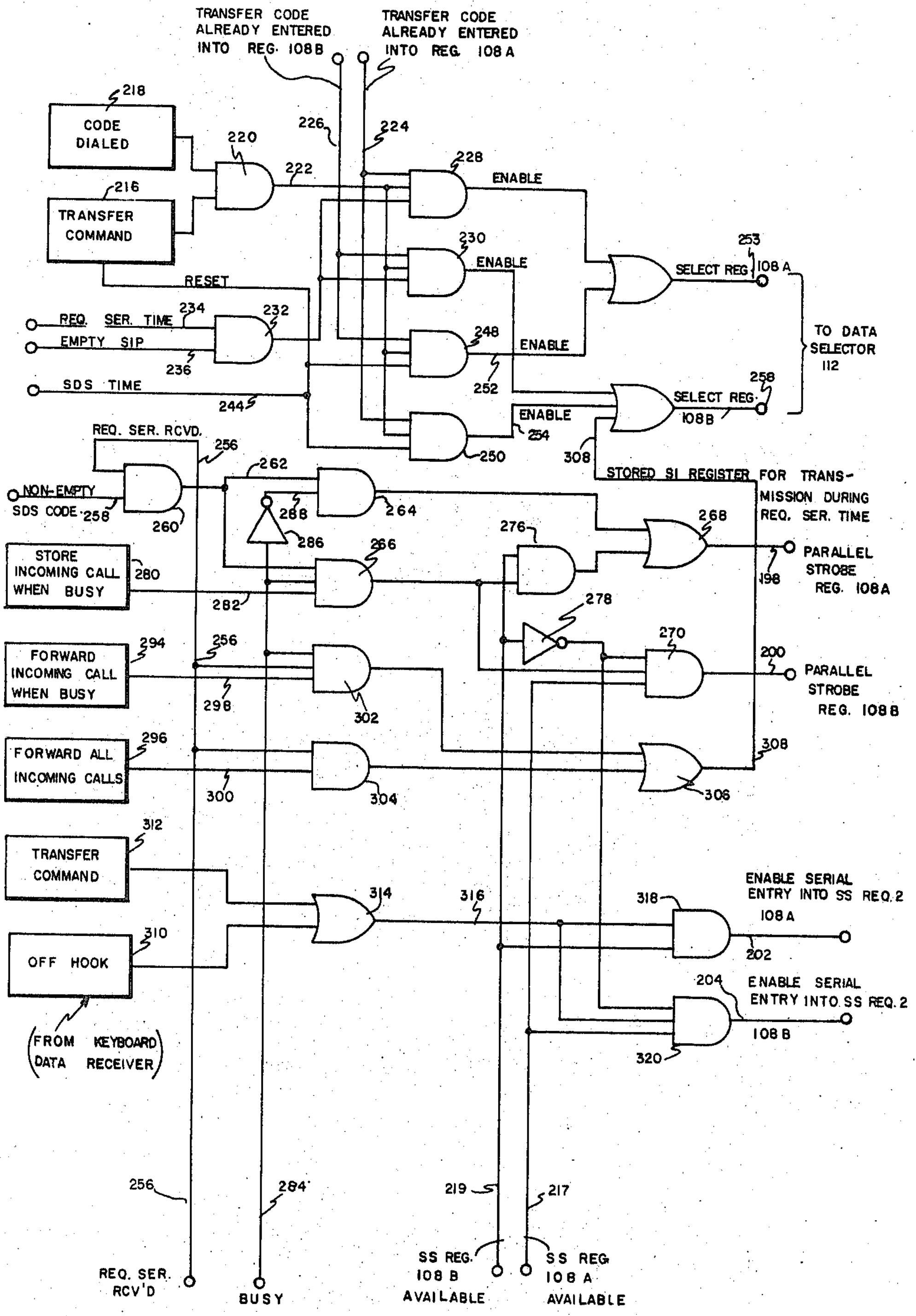
FIG. 7 is a logic circuit diagram of the code control circuit illustrating the manner in which the special telephone functions are received and carried out by such circuit.

Referring to FIG. 7, there is shown a circuit block diagram detailing the logic circuits used for controlling the two Stored SI Registers 108A and 108B. Operation of the call transfer circuitry occurs when a call is in progress and one of the subscribers desires to transfer such call to a third subscriber. Here, a transfer command is made at 216, the transfer address code is dialed at 218, and the dialed transferee address code is entered into an available one of the Stored SI Registers 108A or 108B. Lines 217 and 219 from the Stored SI Registers 108A and 108B, respectively, indicate which one of such registers is available to receive an address for storage. Once the transfer address code has been entered into one of the Stored SI Registers 108A or 108B, then the existing call will be transferred to the subscriber terminal identified by such transferee address. This is accomplished as follows. After the conditions are met wherein the transferee code was dialed at 218 and the transfer command was made at 216, an AND GATE 220 provides an enable signal on line 222 for selecting the appropriate Stored SI Register 108A or 108B having the transferee address code for sending on the transmission line at the appropriate time. Lines 224 and 226 provide signals indicating whether the transfer code has been entered into Stored SI Register 108A or 108B, respectively. Line 224 is applied to AND GATES 228 and 250, and line 226 is connected to each of the AND GATES 228, 230, 248 and 250.

As described previously, when an incoming call is first received at a called subscriber terminal, the called subscriber terminal receives the incoming call by detecting its own address in the Request For Service SIP 24 during the Request For Service time. Following the detection and receipt of an address in the Request For Service SIP 24, there will be an address associated with the originating calling subscriber located in the SI Distribution SIP 20 of the same period (P). A subscriber terminal desiring to transfer a call must insert the transferee address into Request For Service SIP 24. This is done only during the Request For Service time as indicated by a timing signal on line 234 leading into an AND GATE 232. Line 236 is also applied to the input to AND GATE 232 and signals when the Request For Service SIP is available. As indicated in FIG. 7, the AND GATE 232 provides a timing signal to enable the gates 228 and 230. This signal from AND GATE 232, the signal on line 222 from AND GATE 220 and the signal on either of lines 224 or 226 will operate one of the AND GATES 228 or 230 for enabling the transfer address code to be removed from the Stored SI Register 108A or 108B. OR GATES 249 and 251 provide the register selection signals on lines 253 and 255 leading into the data selector 112. As mentioned previously, the signals on lines 224 and 226 from the registers 108A or 108B indicate the register which contains the transfer address code and thereby such signals serve to enable the appropriate gates for producing the register select signals on lines 253 and 255.

As shown in FIG. 7, when a subscriber terminal has a call in progress which it desires, such terminal monitors the Request For Service SIP 24 and, if such SIP is available or empty as indicated on line 236, the signal on line 224 or 226 enables the Stored SI Register 108A or 108B holding the transfer address code to be entered on the transmission line in the Request For Service SIP 24. During the SI Distribution SIP (SDS) Time, a signal on line 244 is applied to both AND GATES 248 and 250. For a subscriber terminal to accomplish call transfer, it must make two address code insertions on the transmission line. The first address code insertion, described above, involves the entry of the transfer address code into the Request For Service SIP 24 for routing the Call to the transferee terminal. The second of these conditions is that the subscriber terminal must insert a distribution SI into the SI Distribution SIP 20 of the same period (P) thereby providing the transferee subscriber terminal with an address code for communicating with the calling subscriber terminal. The distribution SI, which is already located in one of the Stored SI Registers 108A or 108B, is removed from such register by means of the circuitry comprising the AND GATES 248 and 250 and the OR GATES 249 and 251. If the transfer address code was previously entered into the Stored SI Register 108A, then the signal on line 224, which enabled the OR GATE 228 during the Request For Service time, serves to operate the OR GATE 249 for selecting the Stored SI Register 108A for removal of the transfer address code and insertion into the Request For Service SIP 24. This signal on line 224 also serves to enable the OR GATE 250, which during the distribution SIP time indicated on line 244, provides an enable signal on its output line 254 for operating the OR GATE 251 to select the Stored SI Register 108B for removal of the distribution SI. This distribution SI is then entered into the SI Distribution SIP 20. In a similar fashion, if the transfer address code were entered into the Stored SI Register 108B via the AND GATE 230 and the OR GATE 251, the signal on line 226 would also serve to enable the AND GATE 248 during the distribution SI time for operating via its output signal on line 252 the OR GATE 249 to select the Stored SI Register 108A for removal of the distribution SI stored therein.

Referring again to FIG. 7, there is also shown the code control logic circuitry for effecting other special telephone features. Generally, these special telephone features are accomplished through the insertion and removal of address codes stored in the Stored SI Registers 108A and 108B either into or out of the Request For Service SIP 24 and the SI Distribution SIP 20. When an address code is received in the Request For Service SIP 24 by a subscriber terminal, such condition is indicated by a signal on line 256 in the code control circuitry. Also, a signal on line 258 is produced when a non-empty SI Distribution SIP 20 is detected by a terminal. The lines 256 and 258 are connected to the input of an AND GATE 260 which provides an enable signal on line 262 leading into AND GATES 264 and 266. The AND GATES 264 and 266, respectively, are connected at their outputs to an OR GATE 268 and an AND GATE 270, respectively, which provide the parallel strobe signals on lines 198 and 200 leading into the Stored SI Registers 108A and 108B. The parallel strobe signals on lines 198 and 200 enable incoming address data on lines 124 from the Parallel Register 132 to be entered into the Stored SI Registers 108A and 108B, respectively. The availability of the Stored SI Registers 108A and 108B is indicated on the lines 217 and 219. If the Stored SI Register 108A is available, a signal on line 217 is applied to an AND GATE 276 to enable the same and permit the OR GATE 268 to provide a parallel strobe signal on line 198. At the same time, the signal on line 217 is applied to an Inverter Gate 278 for disabling the operation of the AND GATE 270 so that there is no parallel strobe signal produced on the line 200. In a similar fashion, if the Stored SI Register 108B is available, a signal on line 219 will enable the AND GATE 270 to produce a parallel strobe signal on line 200.

When an instruction is dialed at a subscriber terminal through the Keyboard Data Receiver 106, requesting that storage of incoming calls be made when such subscriber is busy, as indicated at 280, a signal on line 282 leading into AND GATE 266 sets up the appropriate gates for storing the incoming call in the available Stored SI Register. Once the command for storage of incoming calls has been made at 280 and the subscriber terminal is busy as indicated by a signal on line 284, then the AND GATE 266 will be operated when an incoming call is received. The receipt of such incoming call is indicated by a signal on line 256 indicating that a Request For Service is received on the line and that a non-empty SI distribution code is present as indicated on line 258. The existence of these conditions operates the AND GATE 260 for providing a parallel strobe signal on either of lines 198 and 200, depending on which of the Stored SI Registers 108A or 108B is available. An Inverter Gate 286 is connected between the busy line 284 and the input to the Gate 264 in a manner which provides an inverted signal at its output line 288 for disabling the Gate 264. Thus, the distribution SI code of an incoming caller received along with the Request For Service command will be stored in parallel in either of Stored SI Registers 108A or 108B via either of strobe lines 198 or 200, respectively.

Two types of forwarding instructions are available to the subscriber. The first of such instructions is to Forward Incoming Calls When Busy and is indicated at 294. The second of these forwarding instructions is to Forward All Incoming Calls and is indicated at 296. If either of these forwarding instructions is presented as a command signal on line 298 or 300, respectively, then AND GATE 302 or AND GATE 304 will provide a signal to an OR GATE 306. For illustrative purposes, as shown in FIG. 7, it is assumed that the address code of the terminal to which calls are to be forwarded is stored in the Stored SI Register 108B. When the receipt of a Request For Service is indicated on line 256, this stored address code is entered in SIP 24 upon receiving a register select signal on output line 255 via the line 308 from OR GATE 306.

In the case where the terminal has requested that incoming calls be Forwarded When Busy, as indicated at 294, then the address code of the terminal, when received in the Request For Service SIP 24, will be removed from the transmission line and substituted with the address code of the transferee station to which the call is to be forwarded. The address code in the Distribution SIP 20 is allowed to propagate on the transmission line past the terminal unaltered and subsequently will be detected by the transferee terminal after it recognizes its own address in the Request For Service SIP 24. In the case where the station has requested, at 296, that all incoming calls be forwarded regardless of whether the station is busy, then the above described operation takes place without requiring the busy signal on line 284.

In either of the operations where a terminal goes Off-Hook at 310 or operates a Transfer Command at 312, an OR GATE 314 will provide an enable signal on line 316 leading into both AND GATES 318 and 320. Depending on which one of the Stored SI Registers 108A or 108B is available as indicated on lines 217 and 219, respectively, one of the Gates 318 and 320 will provide an output signal on line 202 or 204, respectively, for enabling serial entry of a dialed address code from the Keyboard Data Receiver 106 into the available Stored SI Register 108A or 108B, respectively.

Although the above description is directed to preferred embodiments of the invention, it is noted that other variations and modifications of the data processing system will be apparent to those skilled in the art, and therefore, may be made without departing from the spirit and scope of the present disclosure.

What is claimed is:

1. Method of communicating data between subscriber terminals connected on a transmission medium in a telephone communications system, comprising:

assigning, at a first subscriber terminal, a first address register for storing a first address code received for communicating between a first subscriber terminal and a second subscriber terminal;

assigning, at said first subscriber terminal, a second address register for storing a second address code for communicating with a third subscriber terminal;

inserting said address codes into said address registers in response to telephone operation command codes produced by said first subscriber terminal; and selecting, in response to said telephone operation command codes at said first subscriber terminal, between said first and said second address codes stored in said address registers for sending on the transmission medium for communicating with said second or said third terminals;

whereby communications between said first subscriber terminal and said second and third subscriber terminals is determined at said first subscriber terminal by the transmission of the address code selected from the address registers.

2. Method as recited in claim 1, further comprising, at said first subscriber terminal, the step of comparing address codes on the transmission medium with the selected one of said address codes stored in said address registers, and removing data from said transmission medium when the so compared address codes are identical, whereby said first subscriber terminal selectively detects and receives data on said transmission medium.

3. Method as recited in claim 1, wherein the operation of call forwarding is accomplished by said first subscriber terminal by the steps of:

detecting, on the transmission medium, a handshaking address code which identifies said first subscriber terminal;

removing said handshaking address code from the transmission medium; and inserting said second address code on said transmission medium in the same location where said first address code was removed, as a substitute therefor;

whereby a call originally intended for said first subscriber terminal is forwarded to said third subscriber terminal.

4. Method as recited in claim 3, wherein said second address code is stored in said second address register by dialing said code at said first subscriber terminal.

5. Method as recited in claim 3 wherein, said handshaking address code is detected in a first subperiod located within an identifiable position in a period (P) on said transmission medium, said first subperiod being assigned for communicating requests for service.

6. Method as recited in claim 1, wherein the operation of call transfer by said first subscriber terminal of an existing call with said second subscriber terminal is effected over to said third subscriber terminal by:

inserting said second address code, stored in said second address register, on said transmission medium; and inserting said first address code, stored in said first address register, on said transmission medium in a predetermined position relative to the location of said first address code; whereby said third subscriber, upon detection of said second address code, will detect and store said first address code and thereby initiate communications with said second subscriber terminal.

7. Method as recited in claim 6, wherein said step of inserting said second address code on said transmission medium is preceeded by:

detecting an available first subperiod in a period (P) on said transmission medium assigned for making requests for service to a subscriber terminal;

inserting said second address code in said detected subperiod; and inserting said first address code in a second subperiod position assigned for distributing address codes to subscriber terminals.

8. Method as recited in claim 1, wherein consultation holding is accomplished by said first subscriber terminal by:

storing said first address code in said first address register so as to hold the communication with said second subscriber terminal;

dialing a consultation address code constituting said second address code in storage in said second address register;

selecting said second address register for entry of said second address code on said transmission medium so that said first subscriber terminal can communicate with said third subscriber terminal; and upon completion of the call with said third subscriber terminal, removing said second address code from storage and selecting said first address register for re-establishing communications between said first and said second subscriber terminals.

9. Method as recited in claim 8, wherein said second address code is inserted in a predetermined position within a period (P) on said transmission medium for effecting requests for service.

10. Method as recited in claim 1, wherein the operation of call storage is accomplished by said first subscriber terminal by:

receiving said first address code on the transmission medium and storing said code in said first address register;

holding said first address code in response to a telephone operation command code for call storage; and upon removal of said call storage command code, selecting said first address register for establishing communications with said second subscriber terminal by sending said first address code on the transmission medium.

11. Method as recited in claim 1, further comprising:

assigning a handshaking address code permanently to each one of said subscriber terminals in the system; and assigning a subperiod within each period (P) on the transmission medium in which subscriber terminals may make requests for service from other subscriber terminals by inserting the handshaking address code identifying the particular subscriber terminal to which service is requested.

12. Method as recited in claim 11, further comprising assigning an address distribution subperiod within each period (P) in which subscriber terminals may receive a distribution address code for identifying a communication between a pair of subscriber terminals.

13. Method as recited in claim 12, wherein said distribution address code is stored by said subscriber terminals in one of said address registers, and voice data is transmitted between two terminals by address coding said voice data with said distribution address code.

14. Method of communicating information among a plurality of individual subscriber terminals connected on a transmission medium in a telephone communications system, comprising:

assigning a first one of a plurality of subperiods within a period (P) for communicating requests for service from a calling subscriber terminal to a called subscriber terminal;

assigning a second one of said subperiods for distributing an address code for identifying communications between said calling terminal and said called terminal;

inserting at said calling terminal, a handshaking address code identifying a called station into said first subperiod;

inserting, at said calling terminal, said distribution address code identifying said calling station, into said second subperiod;

at a called terminal, detecting said handshaking address code in said said first subperiod on said transmission medium;

at each of said calling and called terminals, storing said distribution address code in a first register;

at either one of said calling and called terminals, storing another address code in a second register for communicating with another subscriber terminal; and selecting, in response to telephone operation command codes produced at either of said calling or called terminals, one of said registers for sending its stored address code on the transmission medium;

whereby a first subscriber terminal can selectively communicate with a second terminal while storing, holding or transferring calls to a third subscriber terminal.

15. Method as recited in claim 14, wherein handshaking between two terminals is accomplished by:

detecting, at said receptor terminal, said handshaking address code received in said first subperiod; and detecting the distribution address code in said second subperiod of the same period having said detected handshaking address code.

16. Method as recited in claim 14, wherein call transfer is accomplished by said calling or called terminal by dialing a transferee address code identifying another terminal;

storing said transferee address code in said second register; and inserting said transferee address code into said first subperiod for communicating a request for service to said identifying terminal.

17. Method as recited in claim 16, further comprising inserting the distribution address code, identifying the call to be transferred, into said second first subperiod located in the same period (P) with the first subperiod having said transferee address code.

18. Method as recited in claim 14, further comprising, removing said stored address codes from said registers at any of said terminals upon completion of calls associated with said address codes.

19. Method as recited in claim 14, wherein said distribution address code assigned to a calling station is identical to the distribution address code assigned to a called station for a given communication between said stations.

20. Method as recited in claim 14, wherein said called station effects a call forwarding operation by removing its own identifying address code from said first subperiod received on the transmission medium, and substituting a transferee address code identifying a transferee station in said first subperiod, wherein said transferee station will detect its own address code in said first subperiod and thereafter will detect and store the distributed address code received in said second subperiod for subsequent communications between said calling station and said transferee station.

21. Method as recited in claim 14, further comprising assigning another one of said subperiods within a period (P) for communicating an acknowledgement code from said called station to said calling station.

22. Method as recited in claim 14, further comprising assigning said distributed address code to two or more communicating terminals on a temporary basis for the duration of the communications between said terminals.

23. Method as recited in claim 14, wherein voice and other data is transmitted between stations by sending said distributed address code as a part of the address coded data communicated between said calling and said called terminals.

24. Method as recited in claim 14, further comprising assigning said distributed addresses to the terminals from a central address distributor for the duration of communications by said terminals, said central address distributor permitting at least two distributed address codes to be associated with a single terminal at a given time, thereby permitting multiple communications.

25. Method of communicating data between subscriber terminals in an address-coded data communications system wherein intelligence data is sent together with the address code assigned to one or more communicating terminals, comprising:

sending, from a calling terminal, a first address code for requesting service from a called terminal;

assigning a second address code to said calling terminal and said called terminal for identifying communications between said terminals;

storing, in a first address register located at each of said calling and called terminals, said second address code;

sending and receiving address-coded data with said second address code forming a part of the data communicated between said calling and called terminals;

at either one of said calling terminal or called terminal, storing a third address code in a second address register assigned for communications with another terminal; and selecting, at either one of said calling or called terminals, the address code stored in said first address register or said second address register for communicating address coded data to other terminals;

whereby the assignment of an address code for identifying a pair of terminals provides communications by a terminal with more than one other terminal.

26. Method of communicating data between subscriber terminals connected on a transmission medium in a telephone communications system, comprising:

assigning, at a first subscriber terminal, a first register for storing a first code designated for communicating between a first subscriber terminal and a second subscriber terminal;

assigning, at said first subscriber terminal, a second register for storing a second code designated for communicating with a third subscriber terminal;

inserting said codes into said registers in response to telephone operation command codes produced by said first subscriber terminal;

selecting, in response to said telephone operation command codes at said first subscriber terminal, between said first and said second codes stored in said registers for communicating with either of said second or said third terminals; and receiving, at the respective second and third terminals, data on said transmission medium which has been sent using said respective first and second codes;

whereby communications by said first subscriber terminal with either said second or said third subscriber terminals is determined at said first subscriber terminal by the use of the code selected from the registers.

27. A telephone communications system having a plurality of subscriber terminals connected to a transmission medium, comprising:

a keyboard at each subscriber terminal for producing the address codes identifying other subscriber terminals and for producing telephone operation command codes;

address code detection means, at each subscriber terminal, for detecting address codes, on the transmission medium, intended for receipt by a given subscriber terminal;

means for assigning a unique address code for identification of each pair of communicating terminals;

a plurality of address storage registers at each subscriber terminal for storing address codes produced at said keyboard or received on the transmission medium, one of said storage registers being used to store the address code for communicating with a second subscriber terminal and one of said storage registers enabling the storage of the address code for communicating with a third subscriber terminal;

control means at each subscriber terminal for controlling and selecting the entry and removal of address codes into and out of said address storage registers, said control means being connected to said keyboard and operating in response to the telephone operation command codes received therefrom, said control means also connected to said address code detection means so as to control the entry and removal of address codes on the transmission medium;

whereby communications by a subscriber terminal with either said second or said third subscriber terminals is determined at said first subscriber terminal by the use of the address code selected from the address storage registers.

28. System as recited in claim 21, wherein said means for assigning a unique address code for identifying each pair of siad subscriber terminals comprises a central address distributor for distributing said address codes to the subscriber.

29. A system as recited in claim 28, wherein said control means includes:

register detection means connected to said address storage registers for determining an available address storage register at a terminal; and a memory connected to said keyboard for determining which of said address storage registers contains the address associated with the operation or communication taking place at a subscriber terminal at a given time.

30. System as recited in claim 28, wherein said control means at a first terminal includes means for selecting a first address code from a first address storage register identifying a communication between said first terminal and a second terminal, for sending on the transmission medium to a third terminal, thereby effecting a call transfer from said first terminal to said third terminal.

31. System as recited in claim 30, wherein said control means also includes dial means for entering a transfer address code dialed by said keyboard into a second address storage register, said transfer address code identifying said third terminal, and means for removing said transfer address code from said second address storage register for sending on the transmission medium to said third terminal together with said first address from said first address register.

32. System as recited in claim 31, wherein said control means includes timing means for entering said transfer address code into a first assigned usbperiod within a period (P) on said transmission medium, and means for entering said first address code into a second assigned subperiod in said period (P).

33. System as recited in claim 27, further comprising assignment means for the terminals for assigning both a first subperiod within a period (P) on said transmission medium for the transmission of a handshaking code identifying the terminal to be called, and a second subperiod within said period (P) for distributing address codes to the terminals, each of said distributed address codes serving to uniquely identify a communication between two particular terminals.

34. System as recited in claim 27, further comprising, at each subscriber terminal, a digital telephone having circuits for converting analog voice signals into a digital code formal for sending over said transmission medium, and circuitry for converting digital data received on said transmission medium into an audible analog signal, said digital telephone being connected to said keyboard for transmitting telephone operation commands to said keyboard.

35. A telephone communications system having a plurality of subscriber telephone terminals connected to a transmission medium and one or more data terminals connected to said transmission medium comprising:

address code detection means at each of said terminals, for detecting address codes intended for receipt by respective terminals;

a plurality of address storage registers at each terminal for storing address codes for communicating with other terminals;

control means at each terminal for controlling the entry and removal of address codes into and out of said address storage registers, said control means including logic means for receiving operation commands for maintaining calls in the form of a first address code in a first address storage register for communication with a second terminal, and said logic means also providing for the storage of a second address code in a second address storage register for communication with a third terminal;

address code sending means responsive to said control means at each terminal for sending an address code from one of said address storage registers on the transmission medium for detection and receipt by another terminal;

handshaking assignment means for the terminals including means for assigning a first one of a plurality of subperiods within a period (P) for communicating requests for service by a calling terminal; and means for assigning another one of said subperiods for communicating an address code for identifying a communication between a calling terminal and a called terminal;

whereby requests for service are made by a calling terminal by sending an address from one of said address storage registers on the transmission medium in said first subperiod for receipt by a called terminal, and subsequent communications between said calling and called terminals are made by sending another address code in said second subperiod.

* * * * *